United States Patent [19]
Petrick et al.

[11] 3,878,410
[45] Apr. 15, 1975

[54] TWO-PHASE LIQUID-METAL MAGNETOHYDRODYNAMIC (MHD) GENERATOR

[75] Inventors: Michael Petrick, Joliet; John C. Cutting, Downers Grove; William E. Amend, Hinsdale; Roger L. Cole, Riverside, all of Ill.

[73] Assignee: The United States of America as represented by the United States Energy Research and Development Administration, Washington, D.C.

[22] Filed: Feb. 21, 1974

[21] Appl. No.: 444,601

[52] U.S. Cl. .................................................. 310/11
[51] Int. Cl. ................................................ H02k 45/00
[58] Field of Search............ 310/11, 10; 73/194 FM; 417/50

[56] References Cited
UNITED STATES PATENTS

| | | |
|---|---|---|
| 3,274,407 | 9/1966 | Brogan.................................. 310/11 |
| 3,309,545 | 3/1967 | Finmerich............................. 310/11 |
| 3,335,289 | 8/1967 | Kidwell............................. 310/11 X |
| 3,414,744 | 12/1968 | Petrick................................... 310/11 |
| 3,525,886 | 8/1970 | Radebold............................. 310/11 |
| 3,634,067 | 1/1972 | Klein................................. 310/11 X |

Primary Examiner—Donovan F. Duggan
Attorney, Agent, or Firm—Dean E. Carlson; Arthur A. Churm; Frank H. Jackson

[57] ABSTRACT

Dissipative boundary layer electrical shunts are eliminated in a two-phase liquid-metal magnetohydrodynamic (MHD) generator by displacing the slow moving, conducting liquid boundary layer adjacent the insulating walls of the generator with a thin gas layer. This is accomplished by injecting an inert gas into the generator channel in the direction of flow of the working fluid through the insulating walls at several locations through a narrow slit extending across the insulating walls.

6 Claims, 8 Drawing Figures

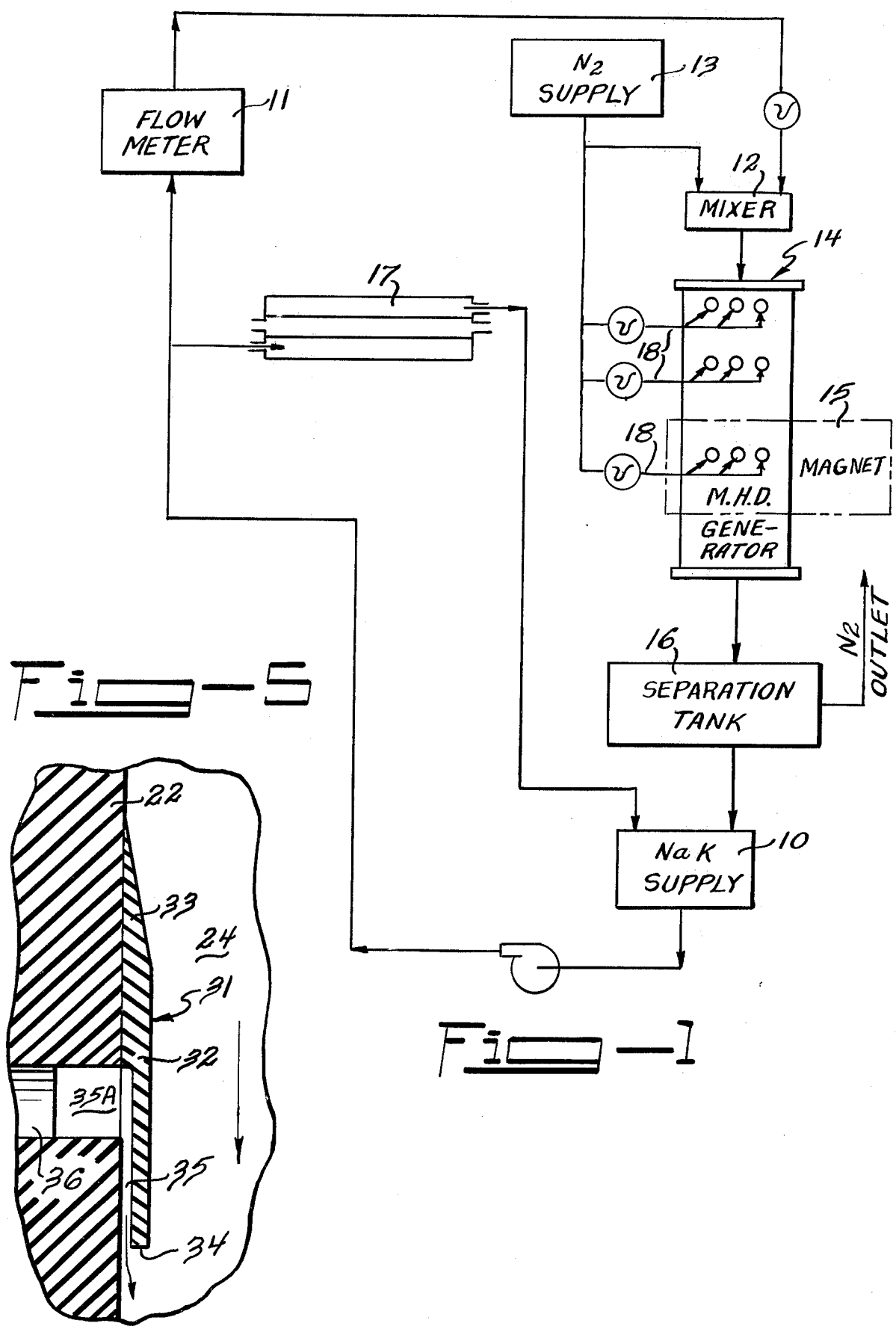

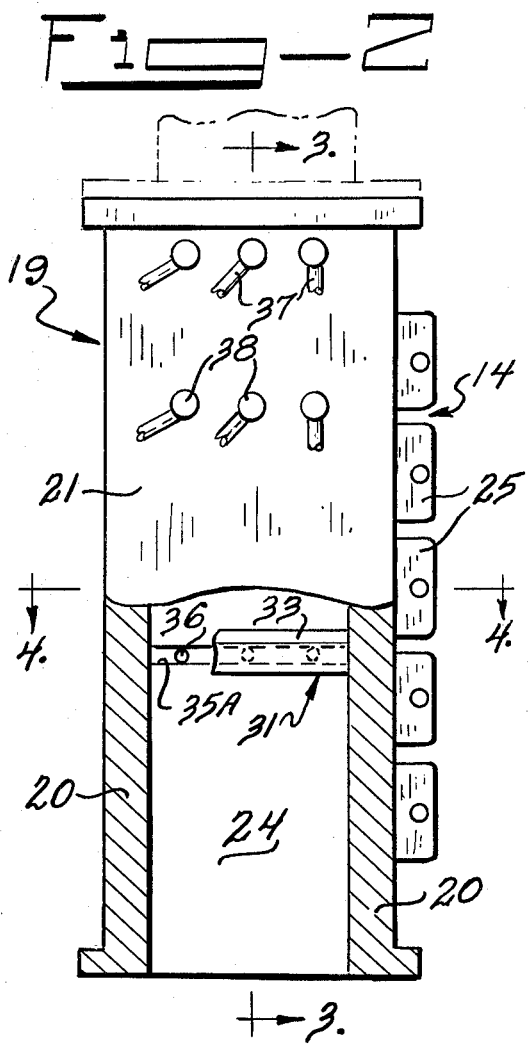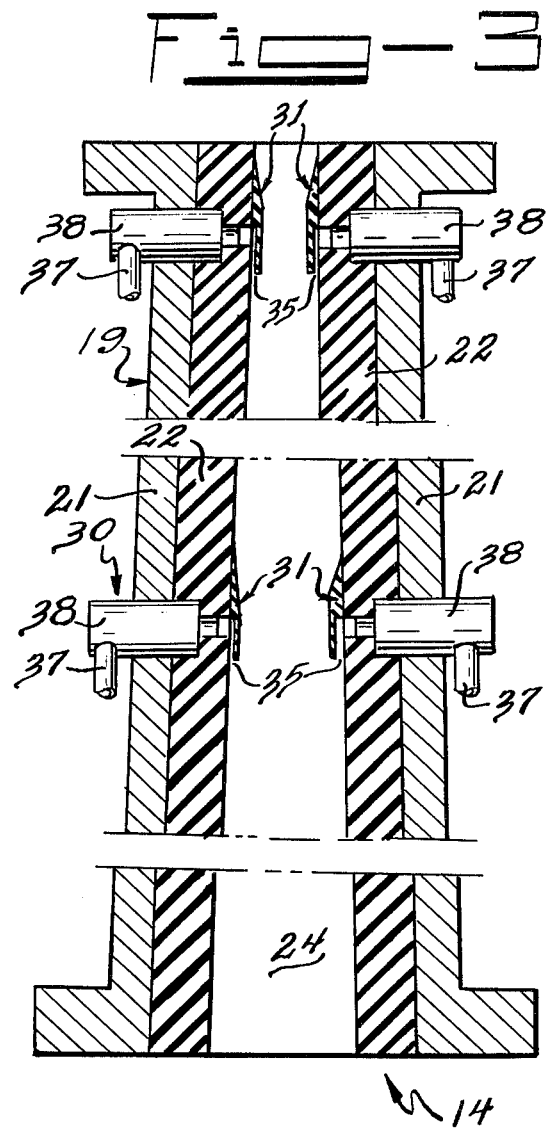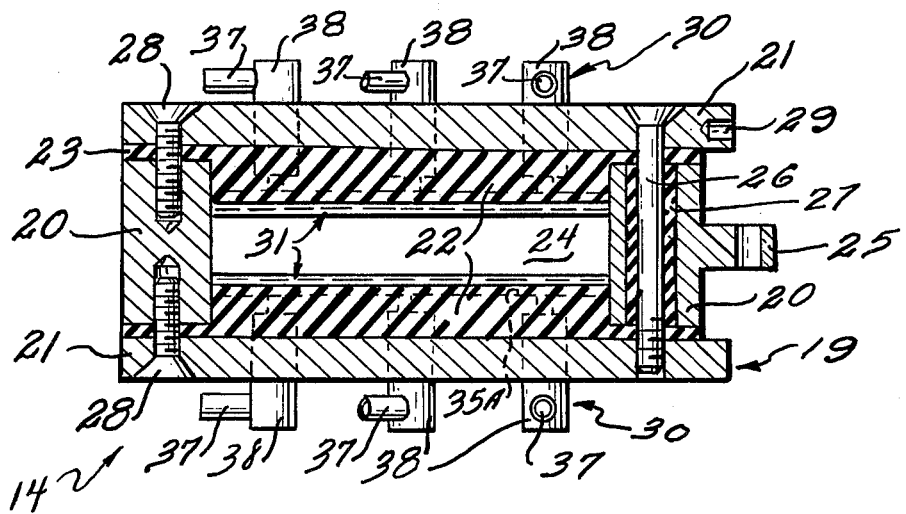

3,878,410

TWO-PHASE LIQUID-METAL MAGNETOHYDRODYNAMIC (MHD) GENERATOR

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to an apparatus for converting thermal energy to electrical energy. In more detail, the invention relates to an apparatus for generating electricity employing a two phase fluid consisting of a dispersion of an inert gas in an electrically conductive liquid as working fluid in a generator. In still more detail, the invention relates to a two-phase liquid-metal magnetohydrodynamic (MHD) generator in which dissipative boundary layer electrical shunts have been eliminated.

Research performed at Argonne National Laboratory over the last decade has shown that liquid-metal power systems offer significant potential advantages over conventional energyconversion systems. These potential advantages include relatively high cycle efficiencies, increased reliability of operation at higher temperatures, and reductions in power system volumes and weights. System studies have indicated the cycle efficiency of power-generating plants using two-phase liquid-metal generators could be 50 percent or more. This over-all performance requires an MHD turbine efficiency for the generator of 70 percent at high mixture qualities (~0.01). The quality of a mixture of liquid and gas is defined as the ratio of the mass flow rate of gas to the total flow rate. Measurements to date in an installation operating at or near ambient temperatures with a mixture of NaK (the eutectic of sodium and potassium) and nitrogen as working fluid have indicated a significant decrease in generator performance as the quality increases beyond 0.002. Thus the object of the present invention is to develop a two-phase liquid-metal MHD generator having better performance at higher mixture qualities.

Experimental data obtained at Argonne National Laboratory coupled with theoretical analysis and modeling has shown that an electrical shunt existed in the generator as originally designed, causing the above-noted decrease in generator performance at higher mixture quality. A portion of the electrical shunt was removed by redesigning and rebuilding the generator to completely eliminate leaks of working fluid and thus a short behind the insulating side walls and a gas-cleaning system and a micropore NaK filter was installed to minimize the amount of gas impurities that could enter the test facility and remove any oxides as soon as they are formed. Performance tests indicated some improvement in efficiency and performance and hence that a portion of the electrical shunt was removed. It was evident, however, that the principal electrical shunt still remained.

We have determined that a major cause of the lack of performance is the presence of an internal boundary-layer shunt. The basic indications are:

1. Boundary layer calculations based on an integral momentum technique predict a boundary-layer shunt resistance between 0.5 and 1.5 milliohms. 2. Good agreement between experiment and theory exists when a boundary-layer resistance of 0.25 to 0.50 milliohms is assumed.

SUMMARY OF THE INVENTION

According to the present invention, improved performance of a two-phase liquid-metal MHD generator is attained by eliminating dissipative boundary-layer electrical shunts. This is accomplished by displacing the slow-moving conducting-liquid boundary layer adjacent the insulating walls of the generator with a thin gas layer (0.0305 cm thick). An inert gas is introduced into the generator channel through the insulating walls at a number of locations in the direction of flow of the working fluid through a narrow slit or slits extending across the insulating walls from electrode to electrode.

DESCRIPTION OF THE FIGURES

The invention will next be described in connection with the accompanying drawing wherein:

FIG. 1 is a flow diagram of an ambient temperature installation incorporating a MHD generator according to the present invention;

FIG. 2 is a vertical cross section taken through the MHD generator;

FIG. 3 is a vertical cross section taken in the direction of the arrows 3—3 in FIG. 2;

FIG. 4 is a horizontal section taken in the direction of the arrows 4—4 in FIG. 2;

FIG. 5 is a detail view of a nozzle used for gas injection.

DESCRIPTION OF THE PREFERRED EMBODIMENT

Figure 6:
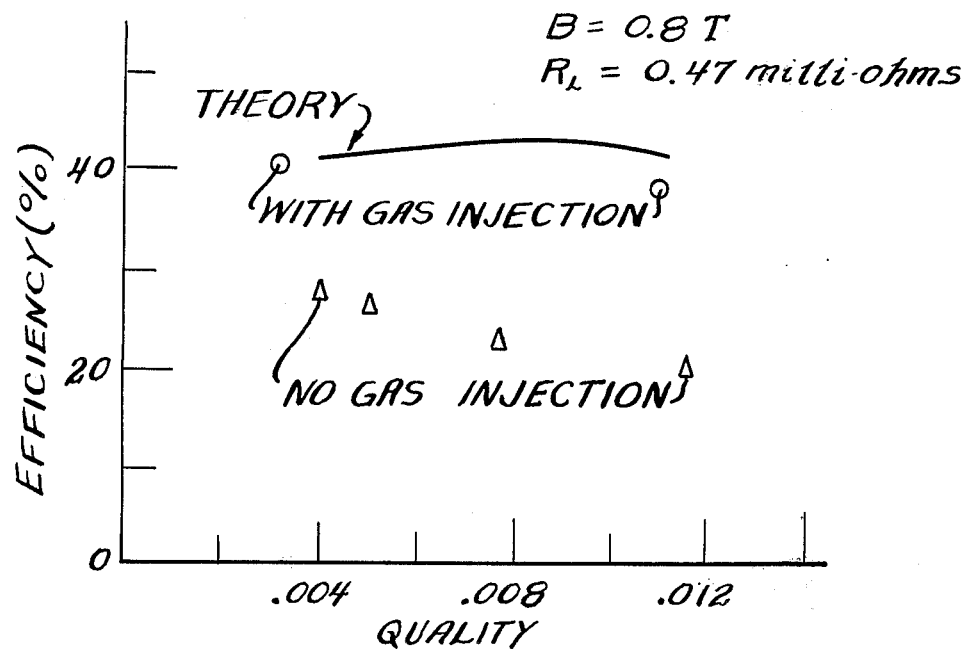
FIGS. 6 and 7 are graphs comparing measured turbine efficiencies as a function of quality for a generator with gas injection with a generator without gas injection.

Referring first to FIG. 1, NaK is pumped from supply tank 10 through flowmeter 11 to mixer 12 where it is mixed with a metered amount of nitrogen from nitrogen source 13. The resulting two-phase working fluid flows rapidly through a magnetic field created in MHD generator 14 by magnet 15 to generate electricity therein and discharges into separation tank 16. Here the nitrogen is exhausted to the atmosphere and the NaK is returned to supply tank 10. A portion of the NaK pumped from the supply tank is cycled through heat exchanger 17 for cooling and return to the storage tank. In accordance with this invention and as will next be described, nitrogen is fed to MHD generator 14 at three locations on each side of the generator through lines 18 to eliminate dissipative boundary-layer electrical shunts.

Referring now to FIGS. 2, 3, 4 and 5, MHD generator 14 includes a duct 19 consisting of opposed, parallel copper electrode walls 20, opposed diverging copper side walls 21, and insulating walls 22 formed of fiberglass covering the interior of side walls 21, said insulating walls 22 including lips 23 which insulate electrode walls 20 from side walls 21. In operation, duct 19 is disposed so as to define a vertically disposed channel 24 extending therethrough.

One of the electrode walls 20 is provided with five lugs 25 for making an electrical connection and this electrode wall, lips 23 of insulating walls 22 and side walls 21 are fastened together by bolt 26 which is insulated from electrode walls 20 by bushing 27. The other electrode wall 20, lips 23 of insulating walls 22 and side walls 21 are fastened together by brass bolts 28 which are set in silver-bearing paste to assure a good electrical connection between the side walls and this electrode. The second electrical connection is to wires set in holes 29 in side wall 21 at the same end of the generator as the lugs 25, the wires being held in place by set screws (not shown). Magnet 15 (shown in FIG. 1 only) creates a magnetic field through channel 24, the side walls 21 acting as compensating bars to eliminate the armature reaction. Magnet 15 is of an adjustable split-yoke type. The field intensity is continuously adjustable from 0.05 to 1.75 Tesla by varying the power supply output from 0 to 250 amperes at 70 volts d.c.

In a two-phase generator, the inert gas expands as it passes through the channel, expending energy to drive the liquid metal against drag forces and electromagnetic forces. As the gas expands, the void fraction increases and the channel walls must diverge so that the cross-sectional area of liquid flow remains constant, giving a constant liquid velocity. Thus, as shown in FIG. 3, according to the preferred embodiment of the invention, insulating walls 22 diverge from top to bottom of the generator.

According to the present invention, dissipative boundarylayer electrical shunts caused by a slow-moving layer of liquid next to the insulating walls of the generator are eliminated by providing means for displacing the slow-moving, conducting liquid boundary layer adjacent the insulating walls. Three pairs of gas injection ports 30 penetrating insulating walls 22 at the generator entrance, and 0.12 and 0.26 meters downstream thereof, are provided for this purpose. Each gas injection port 30 includes a nozzle 31 formed by a fiberglass plate 32 (10 cm × 1.90 cm × 0.089 cm) extending across the generator from electrode to electrode having a 10° leading edge 33 attached to insulating wall 22 and a blunt trailing edge 34 spaced from the insulating wall to form a slit 35 which is 9.52 cm by 0.0305 cm wide for the injection of an inert gas into channel 24 in the direction of flow of the working fluid (see FIG. 5). A channel 35A extends entirely across the insulating walls 22 under each plate 32. Each channel 35A is serviced by three 0.32 cm gas inlet passages 36 extending through insulating walls 22 and terminating at a channel 35A. An inert gas is fed to passages 36 from lines 18 through metal tubes 37 and fiberglass inserts 38 set into a hole in side walls 21 and extending into insulating walls 22. There may be a single slit 35 extending across the insulating walls 22 or a plurality of colinear slits may be employed.

Experiments employing a mixture of NaK and nitrogen have been performed over a wide range of experimental conditions. Prior to performing these experiments in order to test the efficiency of boundary-layer displacement by a gas, a mockup of the generator was tested on a water-flow facility. Four configurations of gas injector nozzles were studied to determine their effectiveness in disrupting the boundary layer. To determine effectiveness of the injector nozzles, resistance between two electrodes mounted flush with the wall was studied. The configuration shown in the drawing gave the best results. Other configurations tested included tapered trailing edges and blunt leading edges for plate 32. Changing from a blunt leading edge to a leading edge having a 10° taper gave very slightly improved results, changing from a tapered to a blunt trailing edge improved results substantially since the flow of liquid metal past the tapered trailing edge disrupted to some extent the flow of gas along the insulating walls of the duct.

Experimental results obtained to date on an installation similar to that shown in the drawing but incorporating parallel side walls rather than diverging side walls indicate that gas injection along the insulating side walls of a generator has been effective in reducing the boundary-layer shunt observed in previous experiments. Dimensions of the channel were: Length 38.7 cm, breadth 10.2 cm and width 1.27 cm.

Figure 7:
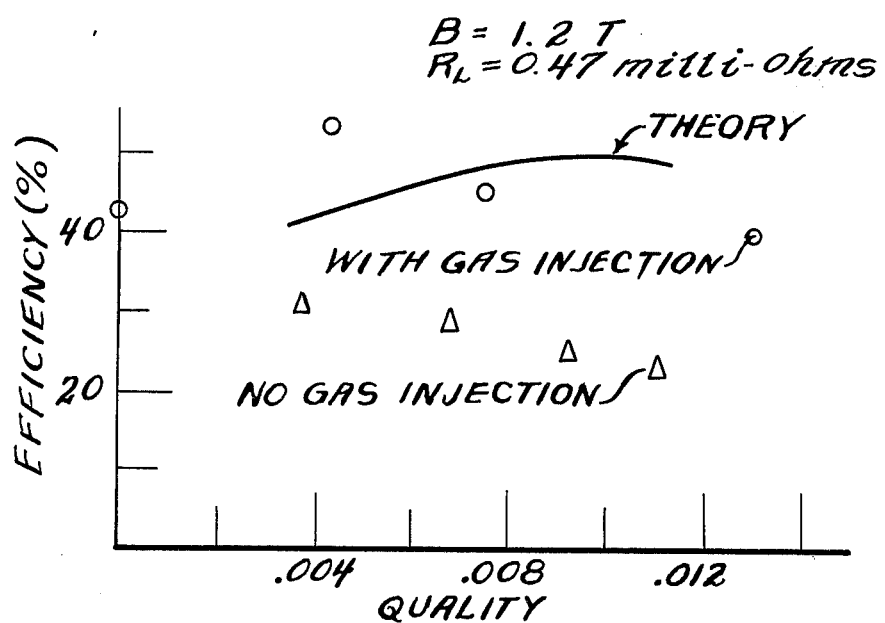

Void fraction measurements made with a gamma-ray scanning system indicate that the injected gas stays near the walls of the generator. Measured turbine efficiencies with gas injection vs. mixture quality are presented in FIGS. 6 and 7 for magnetic field strengths of 0.8 and 1.2 Tesla and a load resistance of 0.47 milliohms. Also present in FIGS. 6 and 7 are the theory for these conditions and previous constant-area channel data taken with no gas injection. The improvement in performance with gas injection is about 100% at high qualities (> 0.01) and between 50 and 70% at low qualities (~ 0.04). Good agreement between theory and experiment is also indicated.

Figure 8:
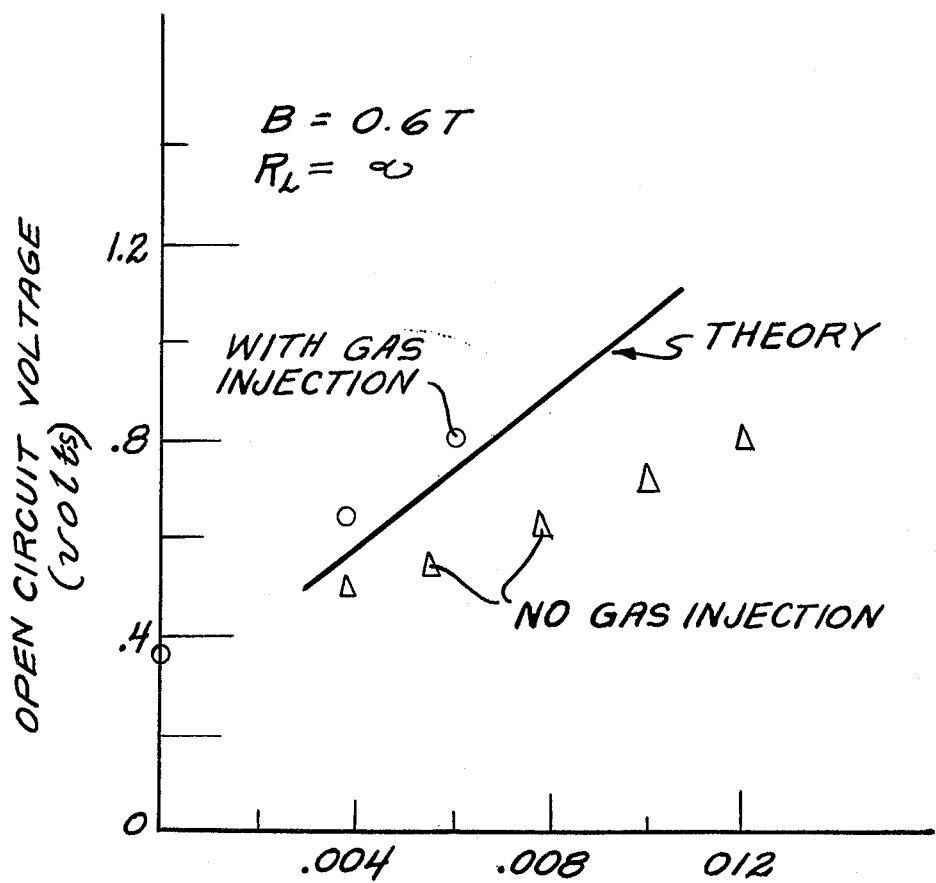
FIG. 8 is a graph giving typical open circuit voltage vs. quality data for generators with and without gas injection.

Typical open-circuit voltage vs. quality data are shown in FIG. 8. The improvement in performance with the gas injection is in excess of 50% at high qualities and between 5 and 20% at the low qualities. This trend indicates elimination of the current shunt which had most effect on performance at high qualities where the ratio of electrical conductivity of the core of the working fluid to that in the boundary layer was the smallest.

The greater-than-theoretical open-circuit voltages observed with gas injection are due to the decrease in generator cross-sectional area, and consequent velocity increase at the gas injector locations. When compared to the theory, modified to account for the reduction in area, the measured voltage exceeded 95% of theoretical.

It will be appreciated that much higher temperature than those employed in the tests reported herein are required for a commerically practicable generator. Experiments are planned on a system operated at 1,000°F. using a mixture of sodium and argon as working fluid. A practical system for the commerical generation of power might be operated, for example, at 1,600°F. employing a mixture of lithium and helium as working fluid.

The embodiments of the invention in which an exclusive property or privilege is claimed are defined as follows:

1. A two-phase liquid-metal magnetohydrodynamic generator comprising a duct consisting of opposing metal electrode walls, opposing metal side walls and insulating walls covering the interior of the side walls, means for admitting a working fluid consisting of a two-phase mixture of an inert gas and a liquid metal to one end of the duct, means establishing a magnetic field through said duct, means for collecting the electric current generated by passage of the working fluid through the duct, and means for establishing a thin film of gas on the insulating walls of the duct to displace the slow-moving boundary layer of working fluid including a plurality of nozzles which inject gas into the duct in the direction of flow of the working fluid in a narrow slit or slits extending across the insulating walls of the duct, said nozzles consisting of an insulating plate extending across the insulating walls of the duct, the leading edge of the insulating plate being fixed to the insulating walls and the trailing edge of the plate being spaced from the insulating walls to create said slit.

2. A generator according to claim 1 wherein said plate has a 10° leading edge and a blunt trailingedge.

3. A generator according to claim 2 including a metal tube leading into a fiberglass insert in the side walls having a passage therein communicating with a passage through the insulating walls opening into a nozzle.

4. A generator according to claim 3 wherein three pairs of nozzles are provided, each nozzle having three gas inlet passages opening thereinto.

5. A generator according to claim 4 wherein the electrode walls of the duct are parallel and the side and insulating walls diverge.

6. A two-phase liquid-metal magnetohydrodynamic generator comprising a vertically disposed duct consisting of opposing, parallel, copper electrode walls, opposing diverging copper side walls and insulating walls covering the interior of the side walls, said insulating walls including lips disposed between the electrode walls and the side walls, one of said electrode walls being provided with lugs for making an electrical connection, a bolt surrounded by an insulating bushing fastening together the side walls, insulating walls and said one of said electrode walls, bolts fastening the other electrode wall to the insulating walls and the side walls, said last mentioned bolts being set in silverbearing paste to assure a good electrical connection between the side walls and this electrode, means for making an electrical connection to a side wall on the same end of the generator as the lugs for making an electrical connection, means for admitting a working fluid consisting of a two-phase mixture of an inert gas and a liquid metal to the top of the duct, means establishing a magnetic field through said duct, and means for establishing a thin film of gas on the insulating walls of the duct to displace the slow-moving boundary layer of working fluid, said last mentioned means consisting of three pairs of spaced fiberglass plates extending across the insulating walls of the duct, the leading edge of said plates being fixed to the plate, the trailing edge of said plates being spaced from the insulating walls to create a slit extending across the insulating walls, said fiberglass plates having a 10° leading edge and a blunt trailing edge, said insulating walls having channels extending thereacross under the fiberglass plates and having three gas inlet passages extending through the insulating wall and opening into each channel, a fiberglass insert disposed in the side walls having a passage therein communicating with said gas inlet passages and metal tubes leading into the fiberglass insert and communicating with the passage therein.

* * * * *